US007876462B2

(12) United States Patent
Kadowaki

(10) Patent No.: US 7,876,462 B2
(45) Date of Patent: Jan. 25, 2011

(54) IMAGE READING APPARATUS, PERSONALIZING METHOD, PROGRAM, AND STORAGE MEDIUM

(75) Inventor: Toshihiro Kadowaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1043 days.

(21) Appl. No.: 10/552,068

(22) PCT Filed: Apr. 2, 2004

(86) PCT No.: PCT/JP2004/004870

§ 371 (c)(1),
(2), (4) Date: Oct. 4, 2005

(87) PCT Pub. No.: WO2004/091188

PCT Pub. Date: Oct. 21, 2004

(65) Prior Publication Data

US 2006/0209359 A1 Sep. 21, 2006

(30) Foreign Application Priority Data

Apr. 4, 2003 (JP) .............................. 2003-102156

(51) Int. Cl.
H04N 1/00 (2006.01)

(52) U.S. Cl. ...................... 358/1.15; 358/440; 713/183; 726/4; 726/5

(58) Field of Classification Search ................. 358/440, 358/1.5, 1.15; 713/183; 726/4, 5
See application file for complete search history.

(56) References Cited

U.S. PATENT DOCUMENTS 6,674,537 B2   1/2004  Kadowaki
6,704,119 B1   3/2004  Suzuki et al.
6,823,459 B1 * 11/2004 Horikoshi et al. ............. 726/17
7,412,720 B1 *  8/2008  Frey et al. ....................... 726/8
7,690,025 B2 *  3/2010  Grewal et al. ................... 726/8
2001/0016820 A1 * 8/2001  Tanaka et al. ................... 705/1
2001/0053247 A1 * 12/2001 Sowinski et al. ............. 382/162
2002/0126322 A1 *  9/2002  Kadowaki ................... 358/440

FOREIGN PATENT DOCUMENTS

| JP | 11-17862 | 1/1999 |
| JP | 11-175225 | 7/1999 |
| JP | 11-196247 | 7/1999 |
| JP | 2000-215253 | 8/2000 |
| JP | 2001-24824 | 1/2001 |
| JP | 2002-271535 | 9/2002 |
| JP | 2002-278393 | 9/2002 |
| JP | 2002-312429 | * 10/2002 |
| JP | 2003-72201 | 3/2003 |

* cited by examiner

Primary Examiner—Benny Q Tieu
Assistant Examiner—Qian Yang
(74) Attorney, Agent, or Firm—Fitzpatrick, Cella, Harper & Scinto

(57) ABSTRACT

An image reading apparatus which can improve the operability in making various settings required for direct transmission of read image data to services on the Internet. The image reading apparatus is connected to at least one external service, which provides at least one service for image data output from the image reading apparatus via a network. Personalized service list information for personalizing the service is acquired so that the operator can use the service. A setting screen, a setting procedure, and contents of setting for the operator are personalized according to the acquired service list information. Various settings based on the setting screen, setting procedure, and contents of setting personalized for the operator are transmitted via the network to the external service, together with the image data.

9 Claims, 12 Drawing Sheets

FIG. 5

NAME OF PERSONALIZED SERVICE:
SERVICE A, A4-SIZE WRAPPING BOOK-BINDING, FOR MYSELF
User ID: 23456 Kadowaki PLEASE SELECT ITEM TO BE CHANGED BY UP/DOWN KEY,
AND SELECT VALUE BY RIGHT/LEFT KEY.
THEN PLEASE PLACE DOCUMENT ON FEEDER,
AND PLACE ORDER.

| | |
|---|---|
| CONNECTION SERVICE | SERVICE A |
| FINISHING SIZE | A4 |
| NUMBER OF COPIES | 1 |
| ONE-SIDED/DOUBLE-SIDED | DOUBLE-SIDED |
| COLOR/BLACK-AND-WHITE | COLOR |
| BOOK-BINDING | WRAPPING BOOK-BINDING (FIRST-PAGE DATA IS USED FOR DISPLAY) |
| ADDRESS FOR DELIVERY | OFFICE A, BLOCK B, DESIGNING DIVISION C, KADOWAKI, TEL 9999 |
| BILLING ADDRESS | DIVISION CODE 1111 |
| ORDERER | DESIGN DIVISION C, KADOWAKI |

SAVE SETTING      ORDER      END

FIG. 6

SERVICE LIST INFORMATION — 11
NUMBER OF REGISTERED SERVICES: 6

55 56 57 52

| | | |
|---|---|---|
| 0 NAME OF SERVICE | SERVICE A | A4-SIZE WRAPPING BOOK-BINDING, FOR MYSELF |
| 1 CONNECTION SERVICE | SERVICE A | https://pod-service.net/ |
| 2 FINISHING SIZE | A4 | |
| 3 NUMBER OF COPIES | 1 | |
| 4 ONE-SIDED/DOUBLE-SIDED | DOUBLE-SIDED | |
| 5 COLOR/BLACK-AND-WHITE | COLOR | |
| 6 BOOK-BINDING | WRAPPING BOOK-BINDING (FIRST-PAGE DATA IS USED FOR DISPLAY) | |
| 96 UID/Password | 23456 Kadowaki / xxxx | |
| 97 ADDRESS FOR DELIVERY | OFFICE A, BLOCK B, DESIGNING DIVISION C, KADOWAKI, TEL 9999 | |
| 98 BILLING ADDRESS | DIVISION CODE 1111 | |
| 99 ORDERER | DESIGN DIVISION C, KADOWAKI | |

53

| | | |
|---|---|---|
| 0 NAME OF SERVICE | SERVICE A | A4-SIZE SADDLE STITCHING, FOR MANAGER GROUP |
| 1 CONNECTION SERVICE | SERVICE A | https://pod-service.net/ |
| 2 FINISHING SIZE | A4 | |
| 3 NUMBER OF COPIES | 4 | |
| 4 ONE-SIDED/DOUBLE-SIDED | DOUBLE-SIDED | |
| 5 COLOR/BLACK-AND-WHITE | BLACK-AND-WHITE | |
| 6 BOOK-BINDING | SADDLE STITCHING | |
| 96 UID/Password | 23456 Kadowaki / xxxx | |
| 97 ADDRESS FOR DELIVERY | 1 COPY TO EACH OF MANAGER A, MANAGER B, MANAGER C, AND MANAGER D | |
| 98 BILLING ADDRESS | DIVISION CODE 1111 | |
| 99 ORDERER | DESIGN DIVISION C, KADOWAKI | |

54

| | | |
|---|---|---|
| 0 NAME OF SERVICE | SERVICE B | FOR POSTER PRINTING SHOP |
| 1 CONNECTION SERVICE | SERVICE B | https://printservice.com/poster |
| 2 FINISHING SIZE | A1 | |
| 3 NUMBER OF COPIES | 4 | |
| 5 COLOR/BLACK-AND-WHITE | COLOR | |
| 8 FINISHING | LAMINATING | |
| 96 UID/Password | 23456789 / yyyyy | |
| 97 ADDRESS FOR DELIVERY | 2 COPIES TO SHOP A, 1 COPY TO SHOP B, AND 1 COPY TO SHOP C | |
| 98 BILLING ADDRESS | DIVISION CODE 1111 | |
| 99 ORDERER | DESIGN DIVISION C, KADOWAKI | |

FIG. 12

| | 55 | 56 | 57 | 81 | 82 |
|---|---|---|---|---|---|
| 0 NAME OF SERVICE | | SERVICE A | A4-SIZE WRAPPING BOOK-BINDING, FOR MYSELF | FIXED | |
| 1 CONNECTION SERVICE | | SERVICE A | https://pod-service.net/ | | |
| 2 FINISHING SIZE | | A4 | | A4/A3/B4/B5 | |
| 3 NUMBER OF COPIES | | 1 | | 1-99 | |
| 4 ONE-SIDED/DOUBLE-SIDED | | DOUBLE-SIDED | | ONE-SIDED/DOUBLE-SIDED | |
| 5 COLOR/BLACK-AND-WHITE | | BLACK-AND-WHITE | | BLACK-AND-WHITE | |
| 6 BOOK-BINDING | | STAPLE BOOK-BINDING | | NO BOOK-BINDING/STAPLE BOOK-BINDING/SADDLE STITCHING | |
| 97 ADDRESS FOR DELIVERY | | OFFICE A, BLOCK B, DESIGNING DIVISION C, KADOWAKI, TEL 9999 | | FIXED | |
| 98 BILLING ADDRESS | | DIVISION CODE 1111 | | FIXED | |
| 99 ORDERER | | DESIGN DIVISION C, KADOWAKI | | FIXED | |
| 93 LOGIN ID | | 0123456 | | FIXED | |
| 94 PASSWORD | | VXWYZ | | FIXED | |

IMAGE READING APPARATUS, PERSONALIZING METHOD, PROGRAM, AND STORAGE MEDIUM

TECHNICAL FIELD

The present invention relates to an image reading apparatus which is provided with an image reading means for reading an image on an original and outputting image data thereof, and a connecting means for connecting to an external service which provides service for the image data output from the image reading means via a network, a personalizing method for the image reading apparatus, a program for implementing the personalizing method, and a storage medium storing the program.

BACKGROUND ART

Conventionally, to use e.g. a printing service on the Internet, the user accesses a site providing the service provided as a Web server on the Internet via a Web browser of a PC (personal computer). On this occasion, if an original to be printed is electronic data, it is possible to transmit the electronic data as it is to the Web server, but if an original to be printed is sheet data, it is necessary to read the sheet original using an image reading apparatus, bring electronic data obtained by reading the original to the user's PC, and then access the Web server through the user's PC to transmit the read electronic data.

According to the above conventional method, however, it is troublesome to carry out at least two operations: an operation of reading a sheet original using the image reading apparatus, and bringing image data obtained by reading the original to a user's PC, and an operation of transmitting the image data from the user's PC to a Web server.

Further, if an image reading apparatus and a PC are connected to each other on a network, the movement of the image data on the network places a burden on the network, and also a long transmission time and a long waiting time for the user are required.

To solve the above problems, it can be envisaged that read image data is directly transmitted from the image reading apparatus to a service on the Internet, but this raises the following problem.

In the case where a plurality of users share a single image reading apparatus, they have to operate an operating screen of the image reading apparatus, but the operating screen is inferior in operability in image data transmission to a user's PC. Specifically, the operating screen of the image reading apparatus is smaller than the operating screen of a PC, and is not provided with a keyboard, a mouse, and the like unlike a PC, and hence the operating screen of the image reading apparatus is inferior in operability in making various settings relating to services on the Internet as compared with a PC.

It is an object of the present invention to provide an image reading apparatus and a personalizing method which can improve the operability in making various settings required for direct transmission of read image data to services on the Internet, a program for implementing the personalizing method, and a storage medium storing the program.

DISCLOSURE OF INVENTION

To attain the above object, in a first aspect of the present invention, there is provided an image reading apparatus comprising image reading unit arranged to read an image on an original and output image data thereof connecting unit to connect to at least one external service providing at least one service for the image data output from the image reading means via a network, personalized service information acquiring unit arranged to acquire personalized service information for personalizing the service so that an operator can use the service, personalizing unit arranged to personalize a setting screen, a setting procedure, and contents of setting for the operator according to the acquired personalized service information, and transmitting unit arranged to transmit various settings based on the setting screen, setting procedure, and contents of setting personalized for the operator by the personalizing unit, together with the image data via the network to the external service.

Preferably, the personalized service information acquiring unit comprises reading unit arranged to read operator identification information and the personalized service information corresponding to the operator from a detachable storage medium, and identification unit arranged to identify the operator according to the operator identification information read from the storage medium.

Also preferably, the personalized service information acquiring unit comprises wireless communication unit arranged to communicate with a storage medium capable of carrying out wireless communication, the storage medium storing operator identification information and the personalized service information corresponding to the operator, and identification unit arranged to identify the operator according to the operator identification information stored in the storage medium.

Preferably, an external server holding personalized service information associated with respective operator identification information is connected to the network, and the personalized service information acquiring unit transmits operator identification information to the external server via the network, and acquires personalized service information corresponding to the transmitted operator identification information from the external server.

Also preferably, an external server holding personalized service information associated with respective operator identification information and respective apparatus identification information is connected to the network, and the personalized service information acquiring unit transmits operator identification information and apparatus identification information to the external server via the network, and acquires personalized service information corresponding to the transmitted operator identification information and apparatus identification information from the external server.

More preferably, the external service comprises a plurality of external services existing on the Internet, and the external server exists on an intranet.

Preferably, the personalized service information includes identification information on services to be used by the operator, and defaults of various settings for the services to be used.

Also preferably, the personalized service information includes identification information on services to be used by the operator, and setting values which can be set by the operator for the services to be used.

Preferably, the personalized service information includes identification information on services to be used by the operator, and setting values inhibited from being used for the services to be used.

Preferably, the personalized service information includes identification information on services to be used by the operator, and setting values which can be used by the operator for the services to be used.

Also preferably, the personalized service information includes identification information to be used by the operator, and setting items inhibited from being used for the services to be used.

Preferably, the external service is inhibited from being used when the personalizing unit omits personalization of the service to be used.

Also preferably, the external service provides a print and book-binding service for the transmitted image data, and the transmitting unit transmits, as the various settings for the external service, settings relating to print format and book-binding format for the print and book-binding service.

Preferably, the external services comprise a print and book-binding service for the transmitted image data, and the transmitting unit transmits, as the various settings for the external service, settings relating to an address for delivery of a printout obtained by the print and book-binding service.

More preferably, the personalized service information includes information indicative of an address of the operator as the address for delivery.

Also preferably, the personalized service information includes information indicative of the operator as who is to be charged for the service.

Preferably, the personalized service information includes part of authentication data to be used for user authentication when the operator uses the service.

Preferably, the personalized service information acquiring unit acquires plural pieces of personalized service information, and the personalizing means comprises selecting means for selecting a desired service from among services personalized for the operator according to the acquired plural pieces of personalized service information.

More preferably, the image reading apparatus comprises adding unit arranged to add various settings as to the service personalized for the operator according to the acquired personalized service information as new personalized service information to the acquired personalized service information.

To attain the above object, in a second aspect of the present invention, there is provided a personalizing method for an image reading apparatus comprising an image reading unit arranged to read an image on an original and output image data thereof, and connecting unit arranged to connect to at least one external service providing at least one service for the image data output from the image reading unit via a network, the method comprising a personalized service information acquiring step of acquiring personalized service information for personalizing the service so that an operator can use the service, a personalizing step of personalizing a setting screen, a setting procedure, and contents of setting for the operator according to the acquired personalized service information, and a transmitting step of transmitting various settings based on the setting screen, setting procedure, and contents of setting personalized for the operator in the personalizing step, together with the image data via the network to the external service.

To attain the above object, in a third aspect of the present invention, there is provided a program for causing a computer to execute a personalizing method for an image reading apparatus comprising an image reading unit arranged to read an image on an original and outputting image data thereof, and connecting unit arranged to connect to at least one external service providing at least one service for the image data output from the image reading unit via a network, the program comprising a personalized service information acquiring module for acquiring personalized service information for personalizing the service so that an operator can use the service, a personalizing module for personalizing a setting screen, a setting procedure, and contents of setting for the operator according to the acquired personalized service information, and a transmitting module for transmitting various settings based on the setting screen, setting procedure, and contents of setting personalized for the operator by the personalizing module, together with the image data via the network to the external service.

To attain the above object, in a fourth aspect of the present invention, there is provided a storage medium storing a program according to the third aspect of the present invention for reading by a computer.

BRIEF DESCRIPTION OF DRAWINGS

FIG. 5 is a view showing an example of an operating screen which is displayed when a personalized service key 25 is depressed on the service list screen for the user with the user ID "23456 Kadowaki" appearing in FIG. 3;

FIG. 6 is a view showing in detail the contents of operator personalized service list information 11 stored in the IC card 9 appearing in FIG. 1;

FIG. 12 is a view showing in detail the contents of personalized service information relating to a book-binding function of operator personalized service list information 11 held on a personalizing server 74 according to a fourth embodiment of the present invention.

BEST MODE FOR CARRYING OUT THE INVENTION

The present invention will now be described in detail with reference to the drawings showing preferred embodiments thereof.

Figure 1:
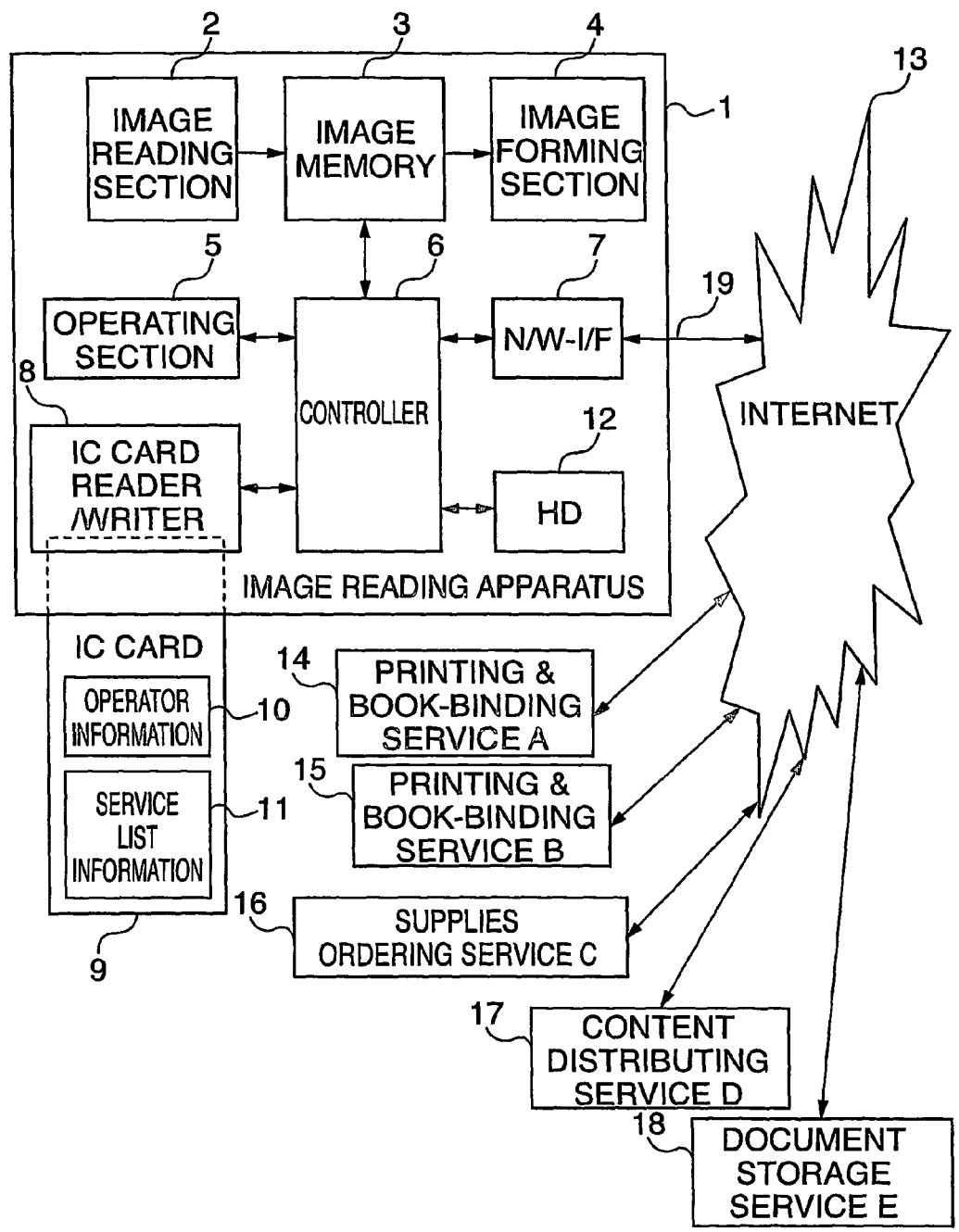
FIG. 1 is a block diagram showing the construction of an image reading system including an image reading apparatus according to a first embodiment of the present invention.

FIG. 1 is a block diagram showing the construction of an image reading system including an image reading apparatus according to a first embodiment of the present invention.

As shown in FIG. 1, the image reading system includes an image reading apparatus 1. In the image reading system, a plurality of users can access sites which provide various services 14 to 18 through the image reading apparatus 1 via the Internet, and use or enjoy the services 14 to 18.

The service 14 is a printing and book-binding service A, which receives and prints out image data read by the image reading apparatus 1, document data produced by a PC, not shown, and so forth, performs book-binding such as wrapping book-binding on the printout, and delivers the printout to a designated place via a delivery service, for example. The service 15 is a printing and book-binding service B provided by a different company from a company which provides the service 14. The service 15 is basically identical in contents with the service 14, but is different in price, book-binding lineup, delivery period, and so forth from the service 14. The service 16 is a supplies ordering service C for ordering e.g. toner and copy sheets. The service 17 is a content distributing service D for holding document contents and distributing them as requested. The service 18 is a document storage service E for receiving and storing image data read by the image reading apparatus 1, document data created using a PC, and so forth.

The image reading apparatus 1 is comprised of an image reading section 2 for reading sheet originals, an image memory 3 for storing image data, an image forming section 4 for carrying out image formation according to image data, an operating section 5, a controller 6, a network interface (N/W-I/F) 7, an IC card reader/writer 8, and a HD (hard disk) 12 for storing various kinds of data such as programs, document data, and image data.

The operating section 5 is used by an operator to issue various operating instructions, and enables various settings in copying, various settings in image reading, and various settings in using various services on the Internet 13. The operating section 5 includes a liquid crystal display 21 with a touch panel (refer to FIG. 2) for inputting the above-mentioned operating instructions. The controller 6 controls the overall operation of the image reading apparatus 1 according to programs stored in the HD 12, and carries out various kinds of processing according to settings made in advance through the operating screen 5. The IC card reader/writer 8 is for reading and writing data stored in an IC card 9 as a detachable storage medium. The IC card 9 stores operator information 10 for identifying an operator who owns the IC card 9, and service list information 11 personalized for the operator.

The image reading apparatus 1 has an image data transmitting function of directly transmitting image data to a site on the Internet 13, which provides a corresponding service, a printing function, and a copying function.

Specifically, according to the image data transmitting function, a sheet original, not shown, is read by the image reading section 2, and the resulting image data is temporarily written to the image memory 3 and transmitted to a selected service on the Internet 13 via the network interface 7, a network cable 19, and the Internet 13. Thus, service for the image data can be provided by the selected service.

According to the copying function, a sheet original is read by the image reading section 2, and image data thus obtained is temporarily written to the image memory 3 and transmitted to the image forming section 4, so that the image forming section 4 forms a copy image.

According to the printing function, document data and image data distributed from the service 17 (content distribution service D) on the Internet 13 are received via the Internet 13, the network cable 19, the network interface 7, and the controller 6, and the received image data is expanded as the need arises and then written as image data to the image memory 3. The image data is read out from the image memory 3 and transmitted to the image forming section 4, so that an image is formed by the image forming section 4.

Figure 2:
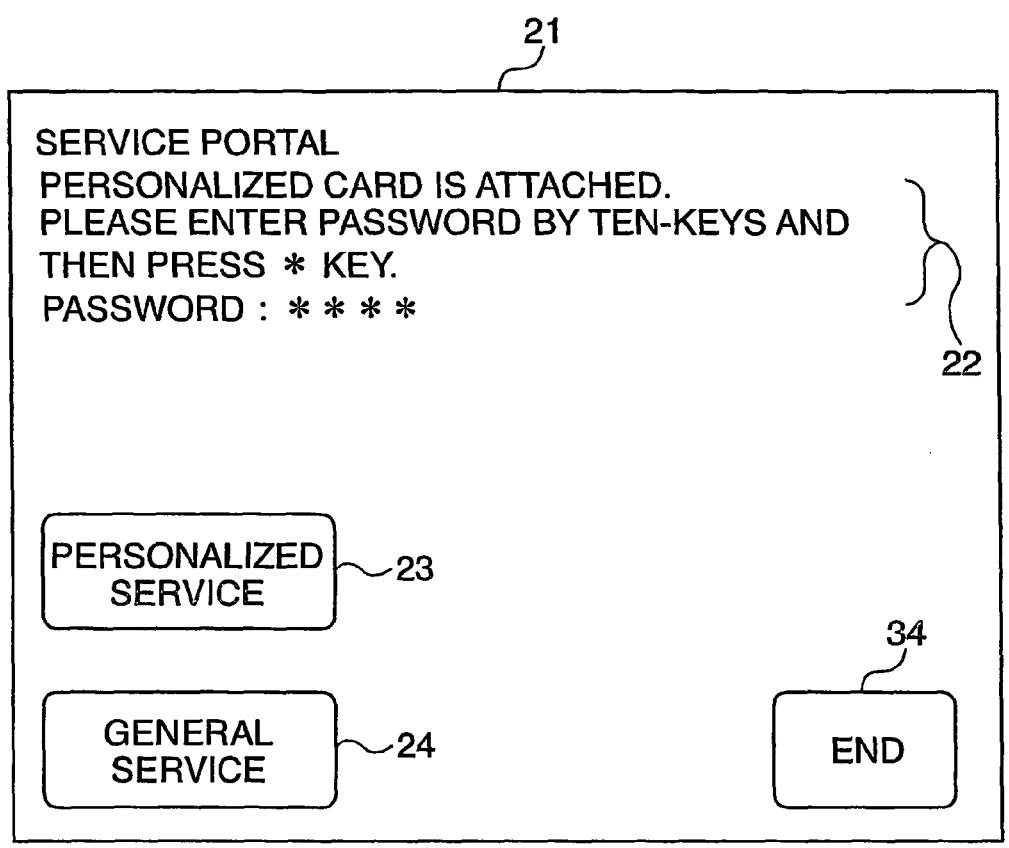
FIG. 2 is a view showing an example of an operating screen related to IC cards displayed on a liquid crystal display 21 with a touch panel in an operating section 5 when an IC card 9 is attached to an IC card reader/writer 8.

Referring next to FIG. 2, a description will now be given of an operating screen displayed when the IC card 9 is attached to the IC card reader/writer 8. FIG. 2 is a view showing an example of an IC card-related operating screen which is displayed on the liquid crystal display 21 with a touch panel in the operating section 5 when the IC card 9 is attached to the IC card reader/writer 8.

When the IC card 9 is attached to the IC card reader/writer 8, a message 22 including a password input field and various operating keys 23, 24, and 34 are displayed on the liquid crystal display 21 with the touch panel provided in the operating section 5 as shown in FIG. 2. In the illustrated example, the message 22 to the effect that a personal card has been attached, and the password input field for ascertaining whether the operator is an authorized owner of the IC card 9 are displayed. If a correct password is entered into the input field, the operator who has attached the IC card 9 is authenticated, and operations through the operating keys 23, 24, and 34 by the operator become ready to be accepted.

Figure 3:
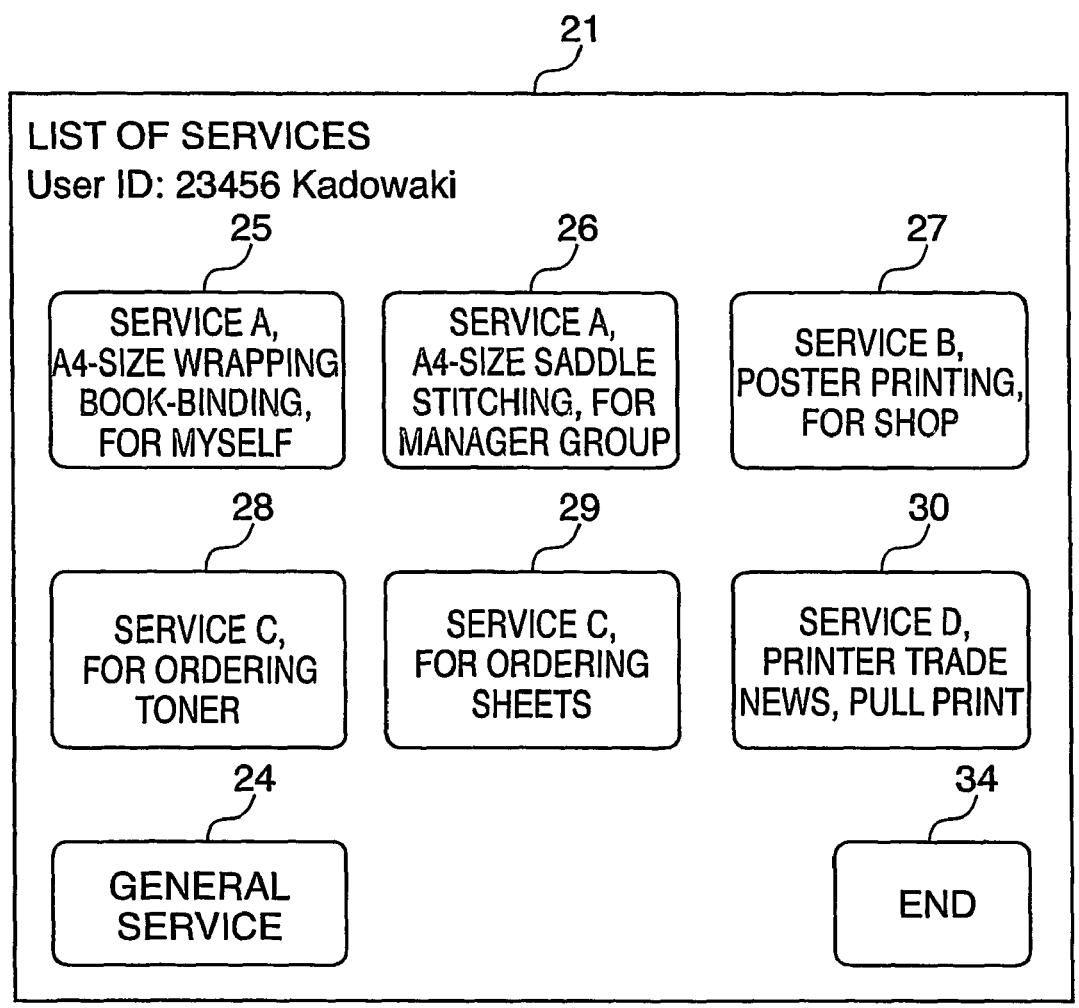
FIG. 3 is a view showing an example of a screen showing a list of services for an operator with a user ID "23456 Kadowaki"
Figure 4:
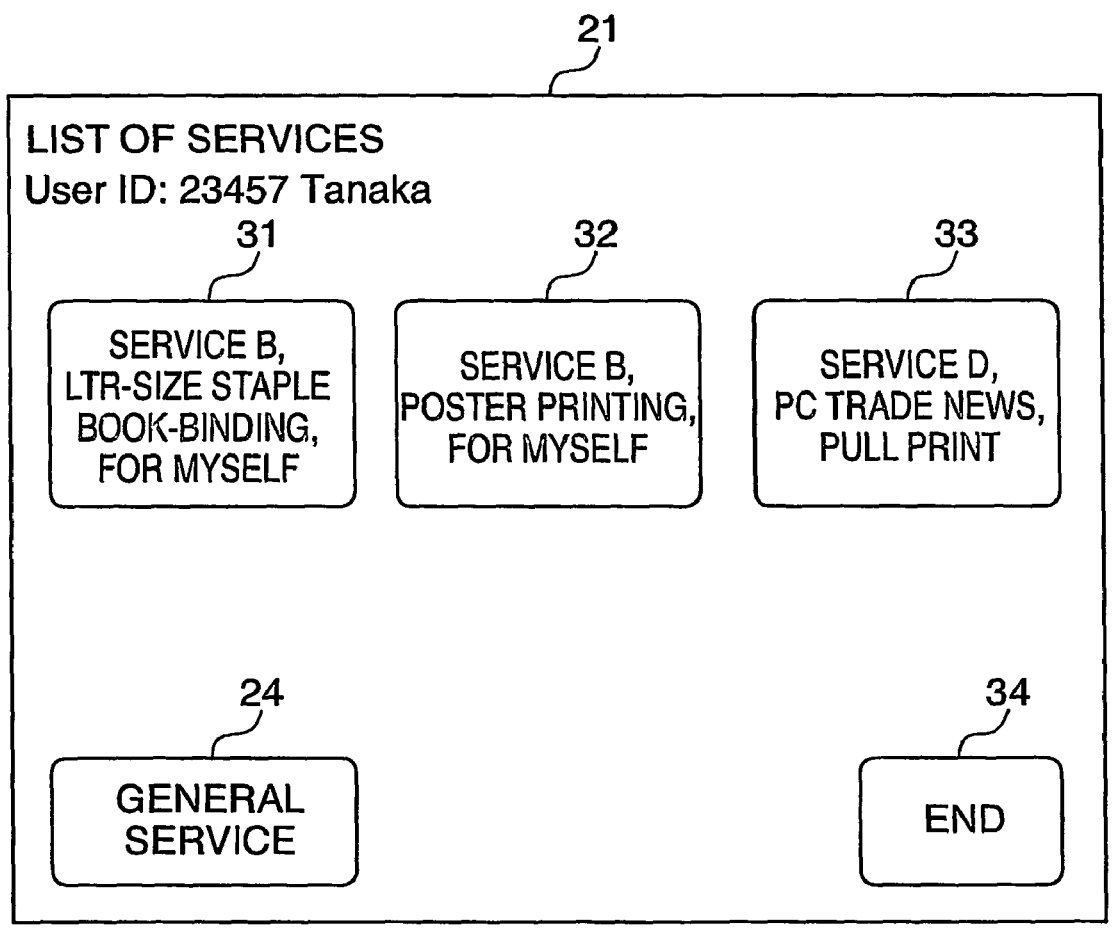
FIG. 4 is a view showing an example of a screen showing a list of services for an operator with a user ID "23457 Tanaka"

The operating key 23 is a personalized service key. When the key 23 is depressed, the operating screen is changed to a screen showing a list of services personalized for each operator as shown in FIG. 3 or 4. The operating key 24 is a general service key. When the key 24 is depressed, the operating screen is changed to a screen, not shown, showing a list of services common to all the operators. The services common to all the operators are called general services, which can be used by all the operators. In the present embodiment, even in the case where the IC card 9 is not attached to the IC card reader/writer 8, an operating screen similar to the operating screen in FIG. 2 can be displayed by depressing a service entry key, not shown, provided on the operating section 5. If a key corresponding to the general service key 24 is depressed on this operating screen, a screen, not shown, showing a list of services common to all the operators (i.e. general services) is displayed as above. The operating key 34 is an end key. When the key 34 is depressed, the operating screen is closed.

The general services are uneasy to use or unnecessary for some operators since they are common to all the operators. Further, the maximum number of services on the Internet 13 is not limited, and various services such as services for PCs, services for image reading apparatuses, and services for printers can be provided on the Internet 13, and therefore, it is troublesome for the operator to search for his/her desired service from among the services each time.

Referring next to FIGS. 3 and 4, a description will be given of a screen showing a service list screen for each operator, which is displayed when the personalized key 23 is depressed. FIG. 3 is a view showing an example of a service list screen for an operator with a user ID "23456 Kadowaki", and FIG. 4 is a view showing an example of a service list screen for an operator with a user ID "23457 Tanaka".

When the personalized service key 23 is depressed on the screen appearing in FIG. 2 in a state in which the IC card 9 owned by the operator with the user ID "23456 Kadowaki" has been attached to the IC card reader/writer 8, as shown in FIG. 3, a service list screen personalized for the operator with the user ID "23456 Kadowaki" is displayed on the liquid crystal display 21 with the touch panel. On this service list screen, personalized service keys 25 to 30 assigned to individually specified six services (hereinafter referred to as "personalized services") are displayed.

The personalized service key 25 is assigned to the printing and book-binding service A 14. When the key 25 is depressed, the image reading apparatus 1 is connected to the printing and book-binding service A 14 (i.e. a site which provides this service) so that the operator can use a wrapping book-binding service. In the wrapping book-binding service, image data read from a sheet original by the image reading section 2 is printed out, and A4-size wrapping book-binding is performed on the printout, which is then delivered to an address designated by the operator with the user ID "23456 Kadowaki". In general, post-processing such as stapling can be performed using a stapler provided in an MFP (Multi Function Peripheral) installed at an office, but some kinds of book-binding such as wrapping book-binding require a binder for exclusive use which carries out e.g. pasting, a cutter which cuts edges of a sheet bundle after wrapping, and so forth, and hence it is difficult to carry out some kinds of book-binding such as wrapping book-binding at an office. Therefore, to carry out wrapping book-binding or the like, the operator uses the personalized service assigned to the personalized service key 25.

The personalized service key 26 is assigned to the printing and book-binding service A 14. By depressing the key 26, the operator can use a service in which image data read from a sheet original by the image reading section 2 is printed out, and A4-size saddle stitching is performed on the printout, which is then delivered to a member of a manager group. In recent years, some MFPs have a saddle-stitching function, but in many cases, the number of pages which can be saddle-stitched is limited to about 16 pages. For this reason, to carry out saddle stitching on a document with about 32 pages, for example, the operator uses the personalized service assigned to the personalized service key 26.

The personalized service key 27 is assigned to the printing and book-binding service B 15. By depressing the key 27, the operator can use a service in which image data read from a sheet original by the image reading section 2 is printed out as an A1-size poster, and the printout is delivered to a designated shop. This personalized service is used e.g. in the case where there is no A1-size printing machine at an office, or in the case where special treatment such as laminating is desired after printing.

The personalized services assigned to the respective personalized service keys 28 and 29 are unrelated to an image reading function. Upon depression of the personalized service key 28 or 29, the image reading apparatus 1 is connected to the supplies ordering service C16 for ordering toner and copy sheets.

The personalized service assigned to the personalized service key 30 is related to the printing function. Upon depression of the personalized service key 30, the image reading apparatus 1 is connected to the content distributing service D17 for ordering a pull print of printer trade news of the day.

When the personalized service key 23 is depressed on the operating screen appearing in FIG. 2 in a state in which the IC card 9 of the operator with the user ID "23457 Tanaka" has been attached to the IC card reader/writer 8, a service list screen personalized for the operator with the user ID "23457 Tanaka" is displayed on the liquid crystal display 21 with the touch panel as shown in FIG. 4. On this service list screen, personalized service keys 31 to 33 assigned to three personalized services are displayed.

For example, the personalized service key 31 is for using the printing and book-binding service B 15. By depressing the key 31, the user can use a service in which an LTR (letter)-size staple book-binding is carried out based on image data read from a sheet original by the image reading section 2, and the resulting book is delivered to an address designated by the operator with the user ID "23457 Tanaka". In Japan, many MFPs generally have no LTR-size sheets ready, and hence the above-mentioned service is used e.g. for LTR-size copying. Thus, even in the case where the operator with the user ID "23456 Kadowaki" and the operator with the user ID "23457 Tanaka" use the same printing and book-binding service B, the details of the service used by the respective operators may be different.

The personalized service key 32 is for using a poster printing service. Upon depression of the key 33, the image reading apparatus 1 is connected to the content distributing service D17 so that a pull print of PC trade news of the week can be distributed to the operator.

As described above, each user can select a service to be used according to his/her business content, business flow, and preference, so that a list of personalized services with preset settings, which are frequently used in the service, is displayed on a service list screen. This improves the operability in using each service on the Internet 13 through the image reading apparatus 1.

Referring next to FIG. 5, a description will be given of an operating screen which is displayed when any of the above personalized service keys is depressed. FIG. 5 is a view showing an example of an operating screen which is displayed when the personalized service key 25 is depressed on the service list screen for the operator with the user ID "23456 Kadowaki" appearing in FIG. 3.

For example, when the personalized service key 25 is depressed on the service list screen in FIG. 3 for the operator with the user ID "23456 Kadowaki", an operating screen is displayed on the liquid crystal display 21 with the touch panel as shown in FIG. 5. A plurality of display areas 41 to 44 are displayed on the operating screen in FIG. 5. The name of a personalized service, a user ID, and how to change setting items of the service are displayed in the display area 41. The names of respective setting items are displayed in the display area 42, and set values for the respective setting items are displayed in the display area 43. The setting items and the defaults of the set values are read out from the service list information 11 stored in the IC card 9, and are displayed on the operating screen in FIG. 5. In the example shown in FIG. 5, the printing and book-binding service A 14 is set as the default of "connection service", an A4-size is set as the default of "finishing size", 1 is set as the default of "the number of copies", double-sided printing is set as the default of "one-sided/double-sided", color is set as the default of "color/black-and-white", and wrapping book-binding is set as the default of "book-binding". Further, the operator himself is set as the default of "address for delivery", and the department to which the operator himself belongs is set as the default of who is to be charged for the service, i.e. "billing address", and the operator himself is set as the default of "orderer's names".

In the display region 44, keys for changing values of the respective setting items are displayed. When a setting item to be changed is selected using an up/down key, not shown, the key corresponding to the selected setting item is highlighted, and then, when a right/left key, not shown, is depressed, another setting value for the setting item is displayed in the display area 43. In the present embodiment, at a time point the operating screen in FIG. 5 is displayed, the image reading apparatus 1 is connected to the printing and book-binding service A 14 to inquire about other set values for the respective setting items. Namely, other candidates for set values are obtained.

When an ordering key 46 is depressed after set values for one or more of the respective setting items are changed as the need arises, a sheet original is read, and image data thereof and the set values in the designated service are transmitted to a site which provides the designated service on the Internet 13. As a result, the contents of the service to be provided for the operator are set.

In this way, a service which is frequently used by the operator and set values for items to be set in using the service are held as defaults of a personalized service. Therefore, when there is no necessity of changing the defaults, ordering is enabled only by depressing the ordering key 46 without changing the set values on the operating screen in FIG. 5.

When a setting saving key 45 is depressed after set values for one or more of the respective setting items are changed as the need arises, a saving screen, not shown, is displayed, so that a group of values set on the screen in FIG. 5 is added as a new personalized service to service list information, or replaces an existing personalized service according to an instruction from the user.

It should be noted that although in the present embodiment, the operating screen in FIG. 5 is displayed in the form of a list for the sake of simplicity, the present invention is not limited to this, but the operating screen in FIG. 5 may be replaced by a Web-screen described in e.g. HTML provided by a Web server which provides the printing and book-binding service A 14, and settings can be made using the Web screen. Even in this case, values read out from the service list information 11 stored in the IC card 9 are used as defaults for respective setting items.

According to the present embodiment, by using the unique personalized operating screen, it is possible to personalize setting items, which can be set, themselves, and hence the image reading apparatus 1 does not have to be provided with a Web browser. On the other hand, in the case where a Web screen is used for operation, it is difficult to personalize setting items themselves, but it is possible to provide the same operability as in the case where a PC is used for operation.

Further, the Web screen should not necessarily be displayed in HTML, but items which can be set in a service and a list of values which can be set for the respective items may be collectively acquired as XML data from an Internet service, and according to the acquired data, the operating screen in FIG. 5 may be controlled through the operation of the image reading apparatus 1. In this case, there is no necessity of inquiring to a Web server about candidates for values which can be set, each time settings are changed.

The XML data may be configured to be held in the IC card 9 so that even if a site which provides the printing and book-binding service A 14 is not accessed at a time point the operating screen in FIG. 5 is displayed, settings as to the printing and book-binding service A 14 can be set on the operating screen in FIG. 5 using the XML data held in the IC card 9.

Referring next to FIG. 6, a description will be given of the details of the operator personalized service list information 11 stored in the IC card 9. FIG. 6 is a view showing in detail the operator personalized service list information 11 stored in the IC card 9 appearing in FIG. 1.

For example, as shown in FIG. 6, the number of registered services "6" indicative of the number of registered personalized services is stored in the operator personalized service list information 11 stored in the IC card 9 of the operator with the user ID "23456 Kadowaki", and pieces of personalized service information 52, 53, 54, . . . are linked to the root of the operator personalized service list information 11. The personalized service information 52 includes item IDs 55 of setting items for a personalized service assigned to the personalized service key 25, names 56 assigned to the setting items, and defaults 57 of the setting items. Similarly, the personalized service information also 53, 54, . . . include item IDs of setting items for personalized services assigned to corresponding personalized service keys, names assigned to the setting items, and defaults of the setting items.

Further, in the present embodiment, each of the personalized service information 52, 53, 54, . . . includes a UID/password item, in which a user ID and a password for use in connection to the corresponding service are written. For example, in the personalized service information 52, "23456 Kadowaki" and "xxxx" are written as a user ID and a password, respectively, for use in connection to a service A. On the other hand, in the personalized service information 54, "23456789" and "yyyy" are written as a user ID and a password, respectively, for use in connection to a service B. Here, user IDs and passwords are different according to services since they are determined on dependence on the services.

As stated above, in the present embodiment, authentication information for use in connection to each service is included in personalized service information, and is used in connection to each service. Therefore, once the user who has attached an IC card to the image reading apparatus 1 is authenticated based on the input password, the user does not have to enter a user ID and a password when connecting to each service, and this alleviates the burden on the user when connecting to each service.

Alternatively, to further improve the security, it may be configured such that corresponding user ID and password are entered when connecting to each service. Also, it may be configured such that a user ID and a password for each service are entered when connecting to each service, and further, a user ID and a password included in personalized service information are transmitted. According to this configuration, it is possible to prevent the user who does not own an IC card from accessing each service.

The personalized service information 53 and 54 correspond to the personalized service keys 26 and 27.

It should be noted that in each personalized service, the same item ID is assigned to the same setting item so that settings can be shared by different services. For example, the personalized service 52 is configured to connect to the service A while the personalized service 54 is configured to connect to the service B, i.e. the personalized services 52 and 54 are configured to connect to different services, but the same item ID "3" is used for a setting item "number of copies". On the other hand, in the personalized service 54 for providing poster printing, there are no setting items such as "book-binding" differently from the personalized service 52.

Further, in each personalized service information, the name of a personalized service is held on the first line, and in the present embodiment, the name is used as a key name in FIG. 3 and as a personalized service name in FIG. 5. When a new personalized service is registered on a predetermined screen, not shown, the operator himself gives the name to it. Alternatively, the image reading apparatus 1 may automatically give the name of each personalized service according to set values of typical setting items for each personalized service in FIG. 6. In the former case, an arbitrary name can be given, and in the latter case, it is unnecessary to input a name.

Figure 7:
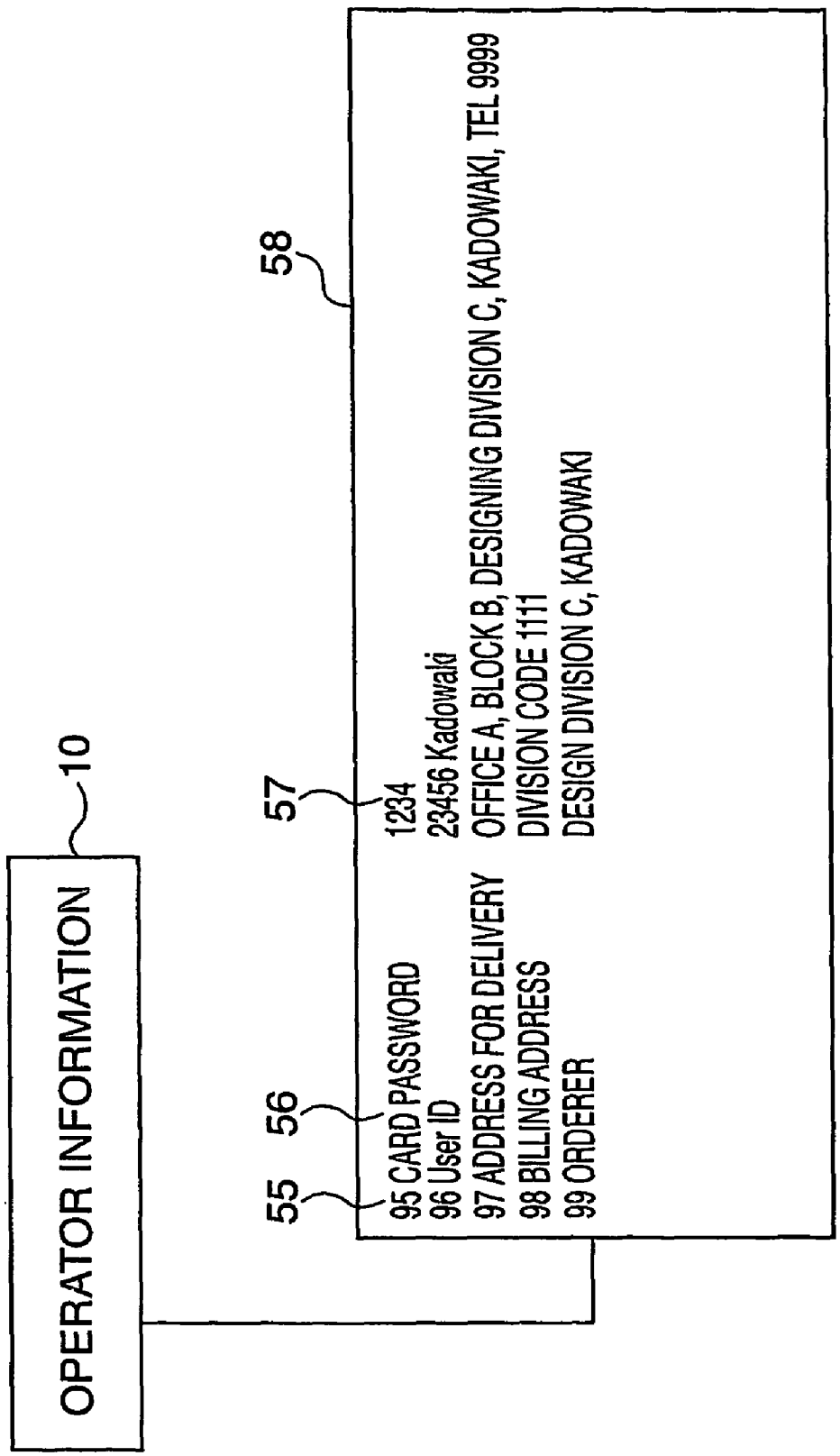
FIG. 7 is a view schematically showing the structure of operator information 10 stored in the IC card 9.

Referring next to FIG. 7, a description will be given of the operator information 10 stored in the IC card 9. FIG. 7 is a view schematically showing the structure of the operator information 10 stored in the IC card 9.

As shown in FIG. 7, the operator information 10 includes a card password for ascertaining whether the operator is the authorized owner of the IC card 9 or not. The card password is used in password verification in FIG. 2. The operator information 10 also includes a user ID for identifying the IC card 9. Further, the operator information 10 includes the location of an office of the owner of the IC card 9 as information indicative of an address for delivery, the code of an organization to which the owner of the IC card 9 belongs as information indicative of who is to be charged, and the name of the owner of the IC card 9 as information indicative of an orderer. These pieces of information are usually required for using an Internet service, and are common information which is different according to operators, but are the same for the same operator. In the present embodiment, such common information included in the operator information 10 is used as defaults of respective items in creating a new personalized service on a predetermined screen, not shown. This reduces the amount of data to be input in creating a new personalized service.

Figure 8:
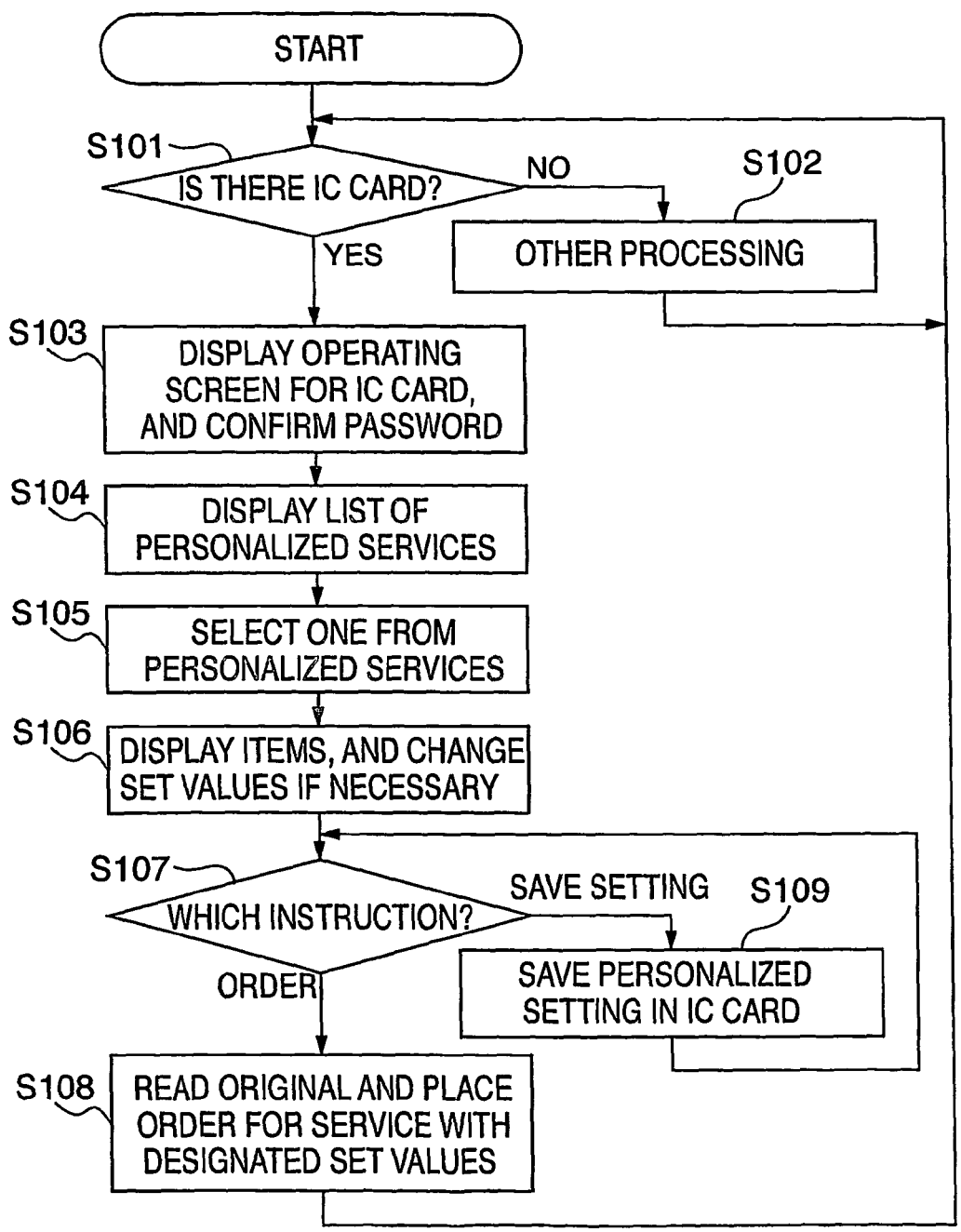
FIG. 8 is a flow chart showing a procedure for controlling the image reading apparatus appearing in FIG. 1.

A description will now be given of how to control the image reading apparatus 1 with reference to FIG. 8. FIG. 8 is a flow chart showing a procedure for controlling the image reading apparatus 1 in FIG. 1. The procedure in FIG. 8 is executed by the controller 6.

As shown in FIG. 8, when the image reading apparatus 1 is started, first, the controller 6 checks in a step S101 whether the IC card 9 is attached to the IC card reader/writer 8 or not. If the IC card 9 is not attached to the IC card reader/writer 8, the controller 6 carries out other processing in a step S102, and the process returns to the step S101.

On the other hand, if the IC card 9 is attached to the IC card reader/writer 8, the controller 6 displays an IC card-related operating screen as described with reference to FIG. 2. When the user inputs a password on the operating screen, the controller 6 collates the input password with a card password held in the IC card 9. As a result of the collation, if the operator is verified as the authorized owner of the IC card 9, the process proceeds to a step S104 wherein the controller 6 provides control to display a user personalized service list screen (shown in FIG. 3 or 4) according to operator personalized service list information held in the IC card 9.

The process then proceeds to a step S105 wherein the controller 6 accepts a service selecting operation by the operator on the screen in FIG. 3 or 4 showing a list of personalized services. Then, in a step S106, the controller 6 provides control to display a personalized item setting screen (shown in FIG. 6) for a service selected by the operator, and as the need arises, the controller 6 accepts changes to one or more setting items, which have been made by the operator. The controller 6 then determines in a step S107 whether an instruction given by the operator is an ordering instruction or a setting saving instruction.

If the instruction given by the operator is a setting saving instruction, the process proceeds to a step S109 wherein controller 6 changes the screen to a saving screen, not shown, and adds values as a new personalized service, which have been set by the operator 5 when the saving instruction is given, to the service list information in the IC card 9, or replaces existing set values in the IC card 9 with them according to the instruction given by the operator (user). Then, the process returns to the step S107. On the other hand, if it is determined in the step 107 that the instruction given by the operator is an ordering instruction, the process proceeds to a step S108 wherein the controller 6 causes the image reading section 2 to read a sheet original, and transmits image data thereof and the set values in the service designated in the step S106 to the designated service on the Internet 13 to place an order. Then, the process returns to the step S101.

As described above, according to the present embodiment, it is possible to improve the operability in making various settings required for direct transmission of read image data to a service on the Internet.

Figure 9:
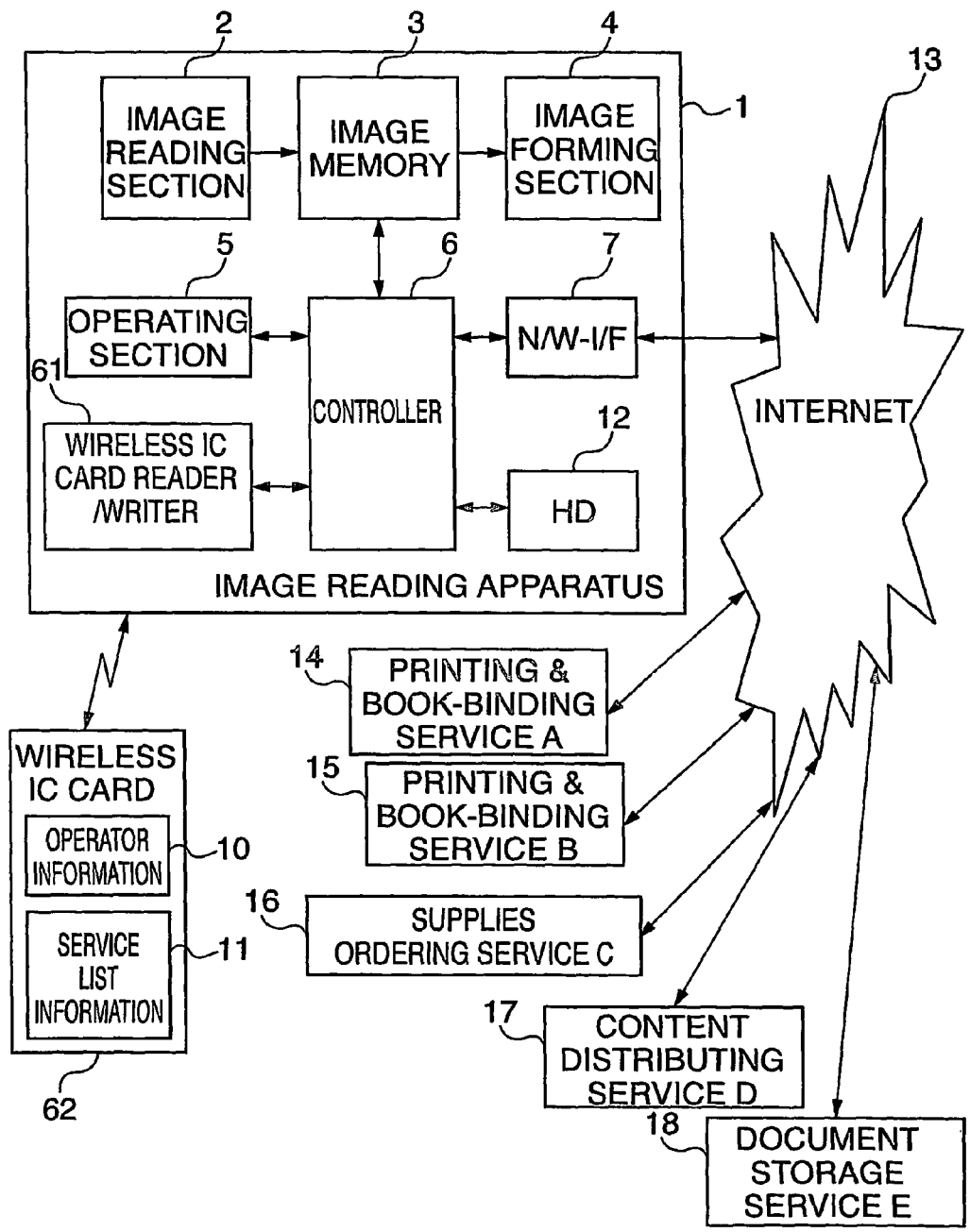
FIG. 9 is a block diagram showing the construction of an image reading system including an image reading apparatus according to a second embodiment of the present invention.

A description will now be given of a second embodiment of the present invention with reference to FIG. 9. FIG. 9 is a block diagram showing the construction of an image reading system including an image reading apparatus according to the second embodiment.

In the above described first embodiment, the IC card 9 and the IC card reader writer 8 are contact types. On the other hand, in the present embodiment, a non-contact wireless IC card 62 and a wireless IC card reader writer 61 are used. The other blocks of the image reading apparatus 1 are identical in construction and function with the first embodiment, and therefore identical elements and parts are denoted by identical numerals.

The contact type used in the first embodiment has the advantage that the cost is lower as compared with the wireless type, and there is no problem of interference which may occur in the case of the wireless type. The wireless type, however, is excellent in operability since it enables reading and writing from and to the IC card 62 only by bringing the IC card 62 close to the IC card reader/writer 61. Also, the wireless type has the advantage that the IC card 62 is unlikely to be broken since it is the non-contact type, and there is no problem of forgetting to detach the IC card 62 from the image reading apparatus 1.

It should be noted that in the present embodiment, any wireless type can be adopted insofar as it is the non-contact type and can exchange the operator information 10 and the service list information 11. For example, Bluetooth or IrDA (infrared communication) can be used.

Figure 10:
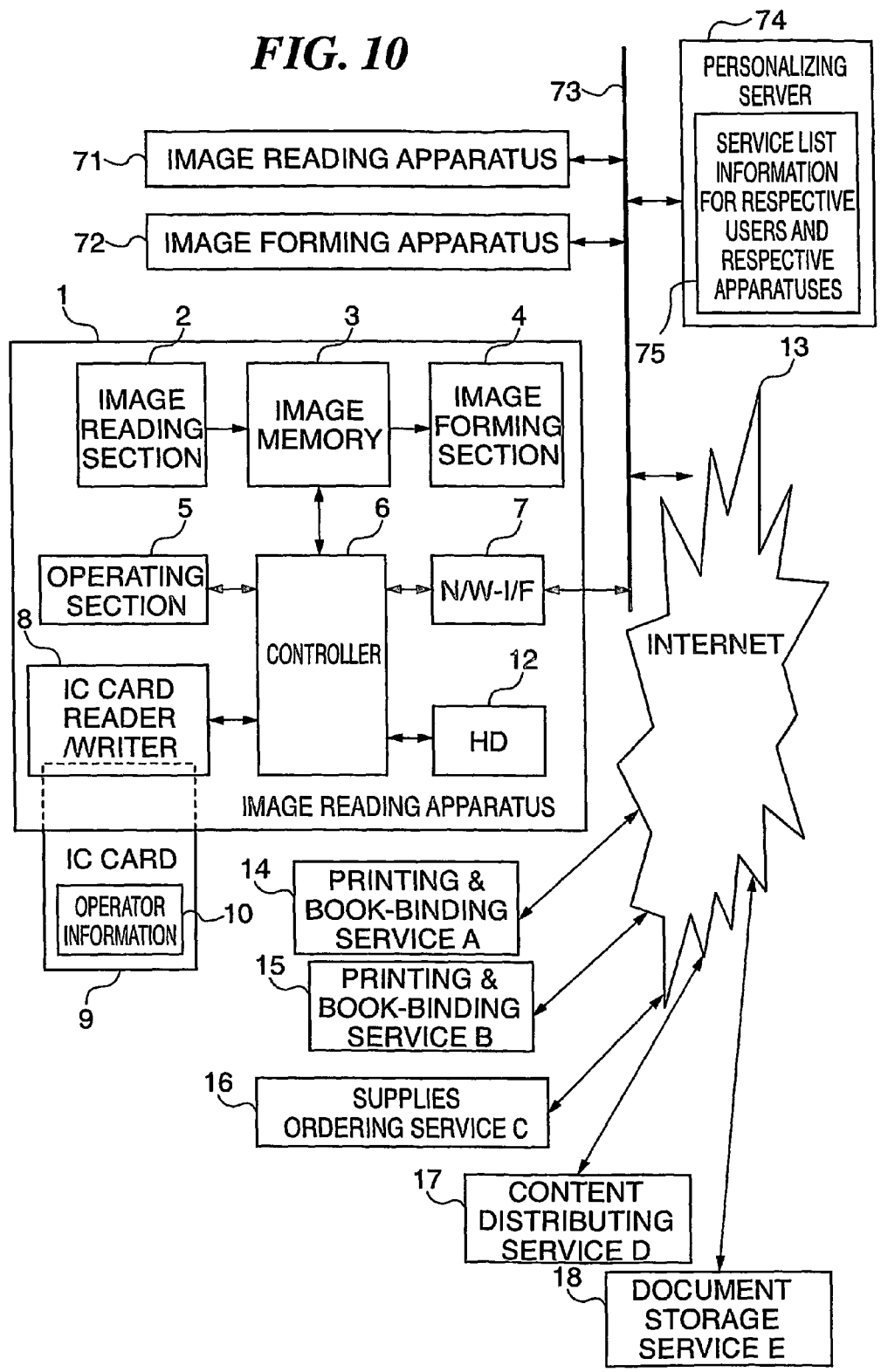
FIG. 10 is a block diagram showing the construction of an image reading system including an image reading apparatus according to a third embodiment of the present invention.
Figure 11:
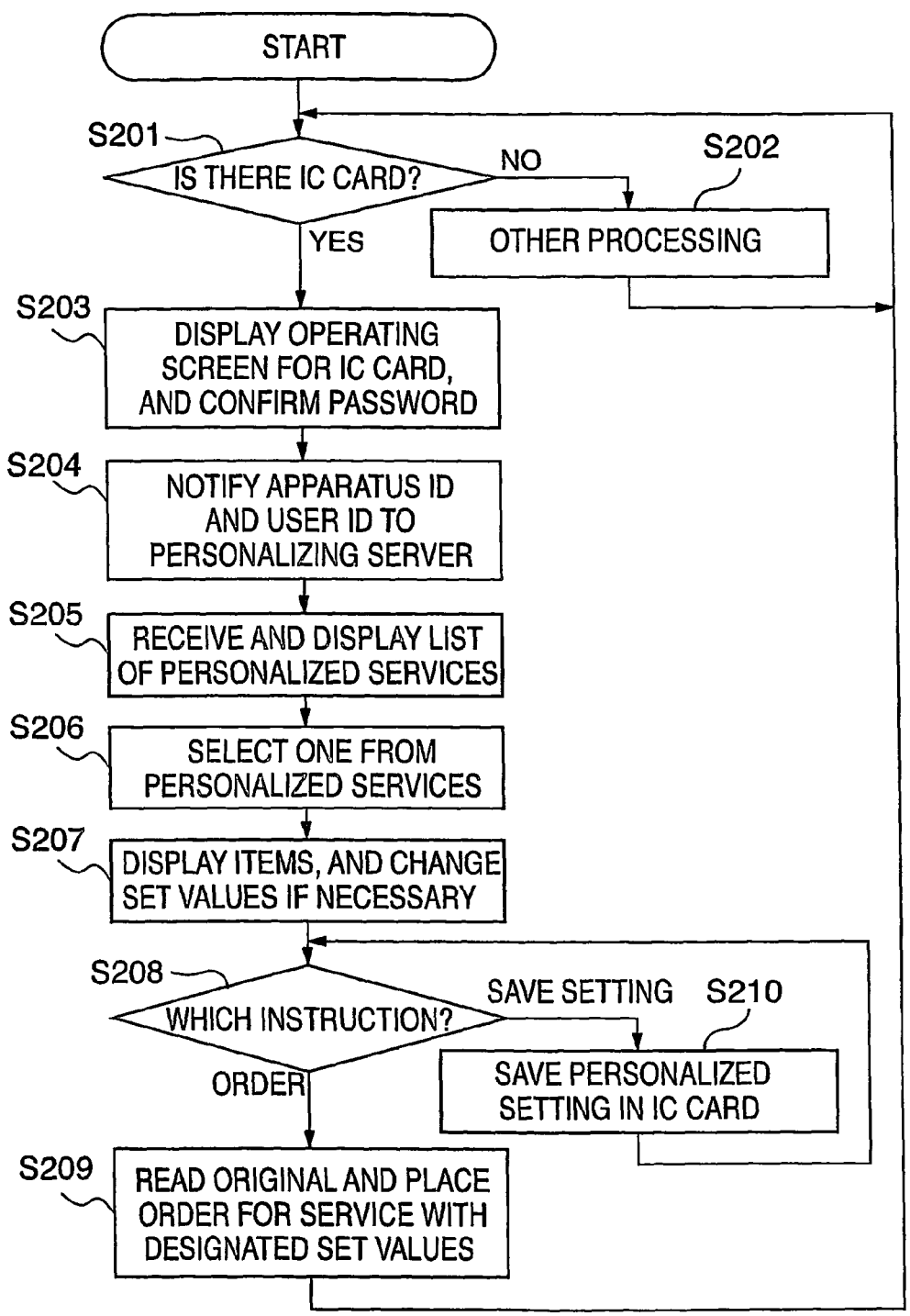
FIG. 11 is a flow chart showing a procedure for controlling the image reading apparatus appearing in FIG. 10.

A description will now be given of a third embodiment of the present invention with reference to FIGS. 10 and 11. FIG. 10 is a block diagram showing the construction of an image reading system including an image reading apparatus according to the third embodiment, and FIG. 11 is a flow chart showing a procedure for controlling the image reading apparatus in FIG. 10. The procedure shown in FIG. 11 is executed by the controller 6. It should be noted that in the present embodiment, elements and parts identical in construction and function with those of the first embodiment are denoted by identical numerals, and description thereof is omitted.

In the above described first embodiment, operator personalized service list information is acquired from the IC card 9, whereas in the present embodiment, service list information 75 for respective operators and apparatuses is acquired from a personalizing server 74 on an intranet 73. In the case where operator personalized service list information is acquired from the IC card 9 as in the first embodiment, no personalizing server is required. On the other hand, the present embodiment in which service list information for respective operators and apparatuses is acquired from the personalizing server 74 has the following advantages: the size of service list information is not limited by the storage capacity of the IC card, the service list information for respective operators and apparatuses can be collectively managed in the personalizing server 74, service list information optimized for respective apparatuses can be distributed, and each service list information can be easily created/edited on the personalizing server 74.

There are other image reading apparatuses 71 and other image forming apparatuses 72 on the intranet 73, and as is the case with the image reading apparatus 1, it is possible to personalize services to be used by the image reading apparatuses 71 and the image forming apparatus 72 using the personalizing server 74.

As shown in FIG. 11, when the image reading apparatus 1 is started, first, the controller 6 checks in a step S201 whether the IC card 9 is attached to the IC card reader/writer 8 or not.

If the IC card 9 is not attached to the IC card reader/writer 8, the controller 6 carries out other processing in a step S202, and the process returns to the step S201.

On the other hand, if the IC card 9 is attached to the IC card reader/writer 8, the process proceeds to a step S203 wherein the controller 8 displays an IC card-related operating screen as described with reference to FIG. 2. When the user inputs a password on the operating screen, the controller 8 collates the input password with a card password held in the IC card 9. As a result of the collation, if the operator is verified as the authorized owner of the IC card 9, the process proceeds to a step S204 wherein the controller 6 encrypts the ID of the image reading apparatus 1 (hereinafter referred to as "the apparatus ID"), the a user ID in the IC card 9 and the password input by the operator and transmits them to the personalizing server 74. The personalizing server 74 ascertains whether or not the operator is an authorized user based on the user ID and the input password. If the operator is the authorized user, the personalizing server 74 transmits service list information corresponding to the received apparatus ID among the operator personalized service list information 75 to the image reading apparatus 1.

Then, in a step S205, the controller 6 receives the service list information from the personalizing server 74, and displays a list of personalized services based on the received service list information as in the step S104 of the first embodiment. As described above, in the present embodiment, it is configured such that an apparatus ID is transmitted to the personalizing server 74, and service list information corresponding to the apparatus ID is received. This is because it is meaningless that an apparatus having only an image reading function receives and displays services associated with image formation, and it is convenient to display only services which can be used by the apparatus.

Then, in a step S206, the controller 6 accepts a service selecting operation by the operator on the screen in FIG. 3 or 4 showing a list of personalized services. Then, in a step S207, the controller 6 provides control to display a personalized item setting screen (shown in FIG. 6) for a service selected by the operator, and as the need arises, the controller 6 accepts changes to one or more setting items, which have been made by the user. The controller 6 then determines in a step S208 whether an instruction given by the operator is an ordering instruction or a setting saving instruction.

If the instruction given by the operator is a setting saving instruction, the process proceeds to a step S210 wherein the controller 6 switches the screen to a saving screen, not shown, and adds values, which have been set by the operator 5 when the saving instruction is given, to the service list information in the IC card 9, or replaces existing set values in the IC card 9 with them according to the instruction given by the user. Then, the process to returns to the step S208. On the other hand, if it is determined in the step S208 that the instruction given by the operator is an ordering instruction, the process proceeds to a step S209 wherein the controller 6 causes the image reading section 2 to read a sheet original, and transmits image data thereof and the set values in the service designated in the step S207 to the designated service on the Internet 13 to place an order. Then, the process returns to the step S201.

Although in the present embodiment, it is configured such that an apparatus ID is transmitted to the personalizing server 74, and service list information corresponding to the apparatus ID is received, the present invention is not limited to this, but it may be configured such that the image reading apparatus 1 receives all of service list information which can be used by the operator from the personalizing server without transmitting the apparatus ID, and extracts and displays services which can be used by the image reading apparatus 1 on an operating screen. This configuration has the advantage that the amount of processing to be carried out by the personalized server 74 can be reduced although processing to be carried out by the image reading apparatus 1 becomes complicated.

Further, the present embodiment has the advantage that the personalizing server 74 can manage in details services which can be used by respective apparatuses since it is configured such that the personalizing server 74 holds apparatuses IDs and operator personalized service list information, and the image reading apparatus 1 transmits an apparatus ID which identifies itself to the personalizing server 74, and receives service list information corresponding to the apparatus ID. Alternatively, in place of the apparatus ID, information on respective apparatus models and information on function types may be transmitted to the personalizing server 74, and corresponding service list information may be received. In this case, the storage capacity of the personalizing server 74 can be reduced since the personalizing server 74 has only to hold service list information classified according to apparatus models such as "an MFP of a type B at a company A" and operators in place of service list information for respective apparatus IDs and operators. Further, according to the method in which function type information is transmitted instead of the apparatus ID, the storage capacity required for the personalizing server 74 can be further reduced since the personalizing server 74 has only to hold service list information classified according to respective function types such as a black-and-white scanning function, color scanning function, black-and-white printing function, color printing function, and facsimile function, and operators, and the personalizing server 74 need not be aware of a specific apparatus model. Thus, if service list information for respective function types is held, there is no need to transmit, for example, a service which handles color information to an apparatus having only a black-and-white scanning function.

In the present embodiment, a card ID held in the IC card 9 is transmitted as identification information on the operator to the personalizing server 74, but alternatively, the operator may input identification information such as a user ID using the operating section 5. Also, identification information on the operator may be acquired using a biological authentication means such as identification through fingerprints.

A description will now be given of a fourth embodiment of the present invention with reference to FIG. 12. FIG. 12 is a view showing in detail the contents of personalized service information relating to a book-binding function of operator personalized service list information 11 held in the personalizing server 74 according to the fourth embodiment.

The present embodiment is different from the above described third embodiment only in how to use service list information, the contents of service list information, and so forth, and therefore a description will only be given of differences between the present embodiment and the third embodiment.

While in the third embodiment, the service list information is personalized so that the operator can hold settings which are frequently used by him, in the present embodiment, it may be additionally configured such that the administrator uses the personalizing server 74 to collectively manage services which can be used by operators as well as setting items and set values which can be used in the services. Therefore, in the case where the image reading apparatus 1 is shared by a plurality of users, it is possible to connect to external services using the image reading apparatus 1 and impose limits on ordering services. For this reason, the present embodiment does not support general services described previously with reference to FIG. 3. Specifically, it is configured such that the operator is identified by the IC card 9 which has been attached to the IC card reader/writer 8, and is allowed to use only services personalized for him using the personalizing server 74.

Further, in the above described first to third embodiments, the operator is permitted to arbitrarily change the set values for the respective setting items relating to each service, but in the present embodiment, limitations are imposed on setting items and set values relating to each service that can be used by each operator. Specifically, in the above described first to third embodiments, only the defaults 57 of the respective setting items relating to each service are stored, but in the present embodiment, as shown in FIG. 12, a limitation list 81 showing set values which can be used by the operator among the setting items relating to each service is held in addition to the defaults 57, and on a screen for changing setting items relating to each service, which corresponds to the screen shown in FIG. 5, set values can be selected within the range of the limitation list 81. For example, in a personalized service in FIG. 12, as a set value for "book-binding", one of no book-binding, staple book-binding, and saddle stitching which are inexpensive can be selected, but wrapping book-binding which is expensive cannot be selected. Also, a set value for a setting item "address for delivery" is fixed to the operator's address, and this setting item itself cannot be changed. On the other hand, for example, it may be configured such that wrapping book-binding is permitted to be selected for a manager B as another operator, and an address for delivery is allowed to be arbitrarily designated. The limitation list 81 can be personalized for each operator only by the administrator, and each operator can personalize a service within the range of the limitation list 81.

In the present embodiment, a list of set values which can be used by each operator is held on the personalizing server 74 as described above, but alternatively, a list of set values which are inhibited from being used may be held on the personalizing server 74. Further, in the present embodiment, values "fixed" are assigned to setting items which are inhibited from being used by the operator so that the setting items cannot be used, but alternatively, setting items which are inhibited from being used may be deleted from the service list information, or setting items which can be used and/or setting items which are inhibited from being used may be additionally held on the personalizing server 74.

Although in the above described embodiments, the present invention is applied to services on the Internet, but it goes without saying that the present invention may be applied to services on an intranet.

It goes without saying that the object of the present invention may also be accomplished by supplying a system or an apparatus with a storage medium (or a recording medium) in which a program code of software which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a floppy (registered trademark) disk, a hard disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM. Alternatively, the program code may be downloaded via a network.

Further, it goes without saying that the functions of any of the above described embodiments may be accomplished not only by executing the program code read out by a computer, but also by causing an OS (operating system) or the like which operates on the computer to perform a part or all of the actual operations based on instructions of the program code.

Further, it goes without saying that the functions of any of the above described embodiments may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

INDUSTRIAL APPLICABILITY

As described above, according to the present invention, personalized service information for personalizing external services is acquired so that the user can use the external services, and a setting screen, a setting procedure, and contents of settings are personalized for the operator according to the acquired personalized service information, and various settings based on the contents personalized for the operator as well as image data are transmitted via a network. Therefore, it is possible to improve the operability in making various settings required for direct transmission of read image data to a service on the Internet.

The invention claimed is:

1. An image reading apparatus arranged to connect, via a network, to at least a first external service and a second external service, each of which provides a service for processing image data generated in the image reading apparatus, the image reading apparatus comprising:

an image reading unit configured to read an image on an original document and generate digital image data corresponding to the read image;

an input unit configured to input a first password for an operator of the image reading apparatus;

an authentication unit configured to authenticate the operator based on the first password input by the input unit;

an acquiring unit configured to acquire, when the authentication by the authentication unit succeeds, personalized service information which is associated with a first ID of the authenticated operator, the personalized service information including at least first setting information which contains a second ID and a second password for the first external service, and second setting information which contains a third ID and a third password for the second external service;

a personalizing unit configured to personalize a setting screen according to the acquired personalized service information; and a transmitting unit configured to transmit various settings which have been set based on the personalized setting screen, the second ID, the second password, and the generated digital image data to the first external service in a case where the first external service is selected, and to transmit various settings which have been set based on the personalized setting screen, the third ID, the third password, and the generated digital image data to the second external service in a case where the second external service is selected.

2. An image reading apparatus according to claim 1, wherein the acquiring unit acquires the personalized service information from a detachable storage medium.

3. An image reading apparatus according to claim 1, wherein an external server holding the personalized service information associated with respective operator is connected to the network, and the acquiring unit transmits the first ID to the external server via the network, and acquires the personalized service information corresponding to the transmitted first ID from the external server.

4. An image reading apparatus according to claim 3, wherein the plurality of external services exist on the Internet, and the external server exists on an intranet.

5. An image reading apparatus according to claim 1, wherein the personalized service information includes information indicative of an address for delivery.

6. An image reading apparatus according to claim 1, wherein the personalized service information includes information indicative of a person to be charged for the service.

7. An image reading apparatus according to claim 1, wherein the acquiring unit acquires plural pieces of personalized service information, and the personalizing unit comprises selecting means for selecting a desired service from among services personalized for the authenticated operator according to the acquired plural pieces of personalized service information.

8. A personalizing method for an image reading apparatus arranged to connect, via a network, to at least a first external service and a second external service, each of which provides a service for processing image data generated in the image reading apparatus, the personalizing method comprising:

an image reading step of reading an image on an original document and generating digital image data corresponding to the read image;

an input step of inputting a first password for an operator of the image reading apparatus;

an authentication step of authenticating the operator based on the first password input in the input step;

an acquiring step of acquiring, when the authentication in the authentication step succeeds, personalized service information which is associated with a first ID of the authenticated operator, the personalized service information including at least first setting information which contains a second ID and a second password for the first external service, and second setting information which contains a third ID and a third password for the second external service;

a personalizing step of personalizing a setting screen according to the acquired personalized service information; and a transmitting step of transmitting various settings which have been set based on the personalized setting screen, the second ID, the second password, and the generated digital image data to the first external service in a case where the first external service is selected, and to transmit various settings which have been set based on the personalized setting screen, the third ID, the third password, and the generated digital image data to the second external service in a case where the second external service is selected.

9. A non-transitory computer-readable storage medium storing a computer program for controlling an image reading apparatus arranged to connect, via a network, to at least a first external service and a second external service, each of which provides a service for processing image data generated in the image reading apparatus, the computer program comprising program codes for performing:

an image reading step of reading an image on an original document and generating digital image data corresponding to the read image;

an input step of inputting a first password for an operator of the image reading apparatus;

an authentication step of authenticating the operator based on the first password input in the input step;

an acquiring step of acquiring, when the authentication in the authentication step succeeds, personalized service information which is associated with a first ID of the authenticated operator, the personalized service information including at least first setting information which contains a second ID and a second password for the first external service and second setting information which contains a third ID and a third password for the second external service;

a personalizing step of personalizing a setting screen according to the acquired personalized service information; and a transmitting step of transmitting various settings which have been set based on the personalized setting screen, the second ID, the second password, and the generated digital image data to to the first external service in a case where the first external service is selected, and to transmit various settings which have been set based on the personalized setting screen, the third ID, the third password, and the generated digital image data to the second external service in a case where the second external service is selected.

* * * * *